United States Patent
Matsumoto et al.

(10) Patent No.: US 7,355,973 B2
(45) Date of Patent: Apr. 8, 2008

(54) DATA TRANSMITTING DEVICE AND METHOD FOR TRANSMITTING AND RECEIVING DATA AND DATA COMMUNICATION SYSTEM

(75) Inventors: Takashi Matsumoto, Yokohama (JP); Nobuyuki Sudo, Yokohama (JP); Hiroaki Hamanaka, Yokohama (JP)

(73) Assignee: Nissan Motor Co., Ltd, Kanagawa-ku (JP)

( * ) Notice: Subject to any disclaimer, the term of this patent is extended or adjusted under 35 U.S.C. 154(b) by 901 days.

(21) Appl. No.: 10/681,191

(22) Filed: Oct. 9, 2003

(65) Prior Publication Data

US 2004/0085903 A1    May 6, 2004

(30) Foreign Application Priority Data

Nov. 5, 2002    (JP) ............... P 2002-321449

(51) Int. Cl.
*G06F 11/00*    (2006.01)
(52) U.S. Cl. .................................... 370/235
(58) Field of Classification Search ............ None
See application file for complete search history.

(56) References Cited

U.S. PATENT DOCUMENTS 5,448,561 A * 9/1995 Kaiser et al. ............. 370/471
2002/0118388 A1 8/2002 Honda et al.
2005/0165940 A1 * 7/2005 Rode et al. ................ 709/230

OTHER PUBLICATIONS

ISO/DIS 15765-2, Road Vehicle-Diagnostics on Controller Area Network (CAN)-Part 2: Network Layer Services, pp. 1-31, 2000.*
Cach et al, IP over CAN, Internet Draft, pp. 1-11, Mar. 2001.*
OSEK/VDX Communication Version 2.2 candidate release 1, Jul. 21, 2000.
ISO/TC 22/SC 3/WG 1/TG 2 N 124 ISO/DIS 15765-2. Mar. 22, 2000.
ISO/TC 22/SC 3 ISO/DIS 11898-1, Jun. 2000.
Postel, J. "The TCP Maximum Segment Size and Related Topics." IETF Standard, Internet Engineering Task Force, IETF, CH, Nov. 1983.

* cited by examiner

*Primary Examiner*—Frank Duong
(74) *Attorney, Agent, or Firm*—McDermott Will & Emery

(57) ABSTRACT

When data is transmitted to a destination of data transmission, a multiplex communication system 1 as a source of data transmission receives, from the destination of data transmission through a data reception processing unit 15, the information about the amount of data which can be successively received, compares the amount of data which can be successively received with the amount of data which can be successively transmitted as preset, selects the smaller amount, creates a packet for successively transmitting data frames corresponding to the amount of data as selected, and transmit said packet through a data transmission processing unit 14.

15 Claims, 5 Drawing Sheets

DATA TRANSMITTING DEVICE AND METHOD FOR TRANSMITTING AND RECEIVING DATA AND DATA COMMUNICATION SYSTEM

CROSS REFERENCE TO RELATED APPLICATION

This application claims benefit of priority under 35USC §119 to Japanese Patent Applications No. 2002-321449, filed on Nov. 5, 2002, the entire contents of which are incorporated by reference herein.

BACKGROUND OF THE INVENTION

1. Field of the Invention

The present invention is related to a data transmitting device and a method for transmitting and receiving data and a data communication system.

2. Description of the Related Art

Communication techniques are known such as communication systems for use in limited areas such as vehicles in which devices are interconnected with a CAN (Controller Area Network) protocol as specified by OSEK (Offene System fund deren Schnittstellen fur die Elektronik im Kraftfahrzeug), ISO (International Standardization Organization) 15765 or the like. The CAN protocol is a serial communication protocol which is especially expected be used as a protocol for a vehicle network and is also expected to be used in medical or agricultural applications because of its high reliability.

In accordance with the communication techniques, when a plurality of terminals exchange data thereamong, the respective steps are performed as follows. When a data transmitting terminal has data to be transmitted to a data receiving terminal, the data transmitting terminal transmits first frame (FF) information to the data receiving terminal. In response, the data receiving terminal transmits a flow control (FC) frame to the data transmitting terminal. The flow control information includes separation time (STmin: separation time min) information indicative of the minimum interval between the successive frames transmitted, and block size (BS) information indicative of the number of frames which can be received. In this case, the block size information is indicative of the number of CAN frames in conformity with the CAN standard.

The data transmitting terminal transmits, to the data receiving terminal at a transmission interval in accordance with the separation time information, the number of CAN frames (CF: Consecutive Frame) compliant with the block size information included in the flow control information returned by the data receiving terminal.

After completely receiving the CAN frames, the data receiving terminal is enabled to receive next CAN frames and then returns flow control information to the data transmitting terminal which, in turn, performs again the transmission of CAN frames in accordance with the flow control information.

Data transmission from the data transmitting terminal to the data receiving terminal is performed by repeating these steps until no more data to be transmitted exists. In accordance with this type of communication technique, the data receiving terminal transmits, to the data transmitting terminal, information about the number of CAN frames which can be successively received and the minimum interval between the successive CAN frames in order to inform the data transmitting terminal of the memory capacity for receiving data and the speed for receiving data, so that the data transmitting terminal can perform the communication in compliance with the requirements of the data receiving terminal.

SUMMARY OF THE INVENTION

However, in accordance with the conventional technique, since the data receiving terminal transmits, to the data transmitting terminal, the block size information corresponding to the memory capacity for receiving data of the data receiving terminal, the data transmitting terminal might not be able to successively transmit the number of frames in accordance with the block size information in the case where the memory capacity for receiving data of the data receiving terminal is greater than the memory capacity for transmitting data of the data transmitting terminal.

Accordingly, in accordance with the conventional technique, it is necessary to confirm the memory capacity for transmitting data of the data transmitting terminal for the data receiving terminal in the system design phase and to set, in the data receiving terminal, an appropriate block size corresponding to the memory capacity for transmitting data.

The present invention has been made in the circumstances as described above. According to the present invention, a data transmitting device and a method for transmitting and receiving data and a data communication system relating to the communication among devices with a communication protocol such as CAN protocol can be provided, in which, even when the memory capacity of a terminal is changed by the design change of the system, the communication capability is maintained without redesigning the whole system with respect to the memory capacities.

According to the technical aspect of the present invention, when data is transmitted to a destination of data transmission, a source of data transmission receives, from the destination of data transmission, information about the amount of data which can be successively received, compares the amount of data which can be successively received with the amount of data which can be successively transmitted as preset, selects one of the amounts of data that is no greater than the other, creates a packet for successively transmitting data frames corresponding to the amount of data as selected, and transmits said packet.

DESCRIPTION OF THE PREFERRED EMBODIMENT

In the following description, an embodiment of the present invention will be explained in conjunction with the accompanying drawings.

Figure 1:
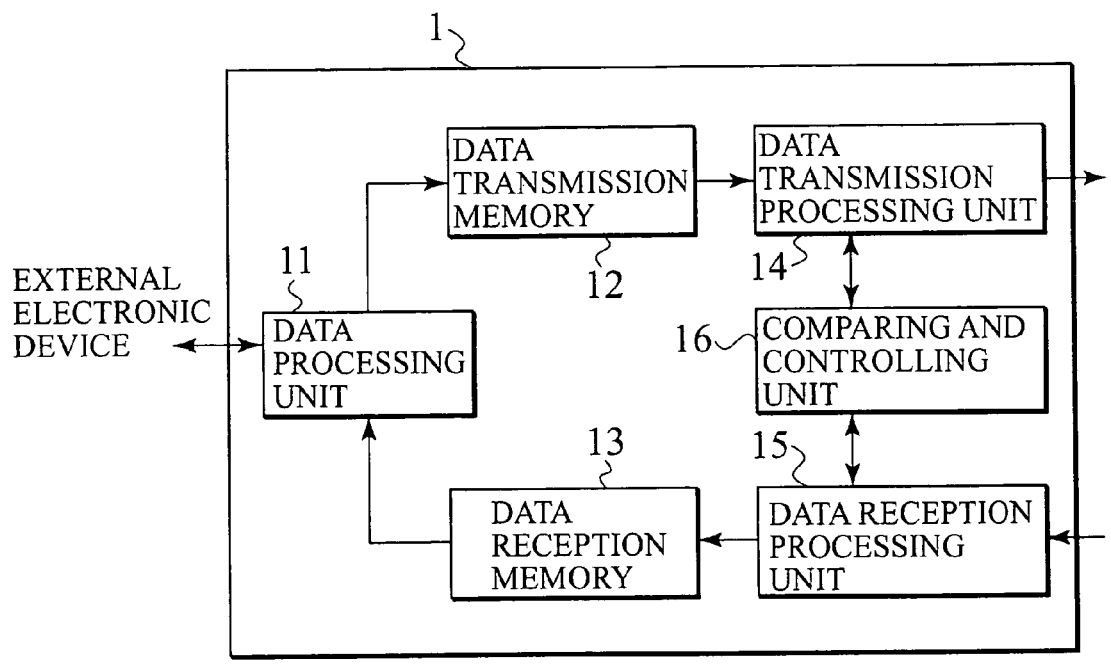
FIG. 1 is a block diagram showing the functional configuration of a multiplex communication system of the present invention.

The present invention is applicable to a multiplex communication system 1 having a functional configuration as illustrated in FIG. 1. This multiplex communication system 1 can be connected to another multiplex communication system 1 and achieves two-way communication by full-duplex transmission therebetween through a communication line.

Configuration of the Multiplex Communication System

This multiplex communication system 1 is provided with a data processing unit 11 connected with an external electronic device. This data processing unit 11 is provided, by the external electronic device, with outgoing data to be transmitted to another multiplex communication system 1 and receives incoming data from the other multiplex communication system 1. When outgoing data is provided from the external electronic device, said outgoing data is stored in a data transmission memory 12. Also, when incoming data is stored in a data reception memory 13, the data processing unit 11 extracts and processes said incoming data followed by transferring it to the external electronic device. The data transmission memory 12 and the data reception memory 13 are storage means, which can be implemented in the form of a single storage device.

In the case where communication is performed among these multiplex communication systems 1, a channel setting process is made in advance between the respective multiplex communication systems 1. By this channel setting process, each multiplex communication system 1 is given a frame ID assigned for identifying data frames so that data and information can be exchanged with reference to said frame ID.

Figure 2:
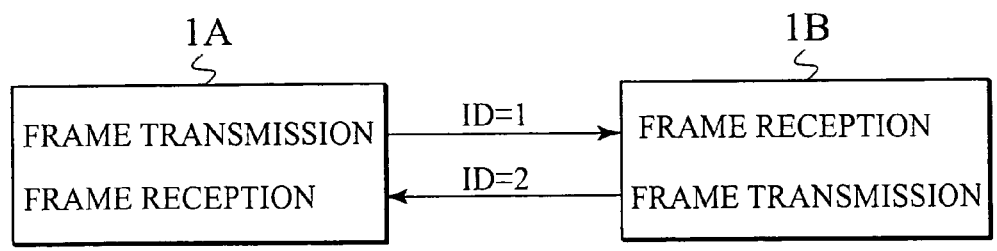
FIG. 2 is a schematic diagram for explaining the process of setting frame IDs between a multiplex communication system in the data transmitting side and a multiplex communication system in the data receiving side.

In the case of the communication between a multiplex communication system 1A and a multiplex communication system 1B as illustrated in FIG. 2, the channel setting process is made between the multiplex communication system 1A and the multiplex communication system 1B to each other. Namely, the frame ID of the multiplex communication system 1A is assumed to be "1" while the frame ID of the multiplex communication system 1B is assumed to be "2". Each of these frame IDs is stored in the ID field 41 of a frame as illustrated in FIG. 3(C).

Figure 3:
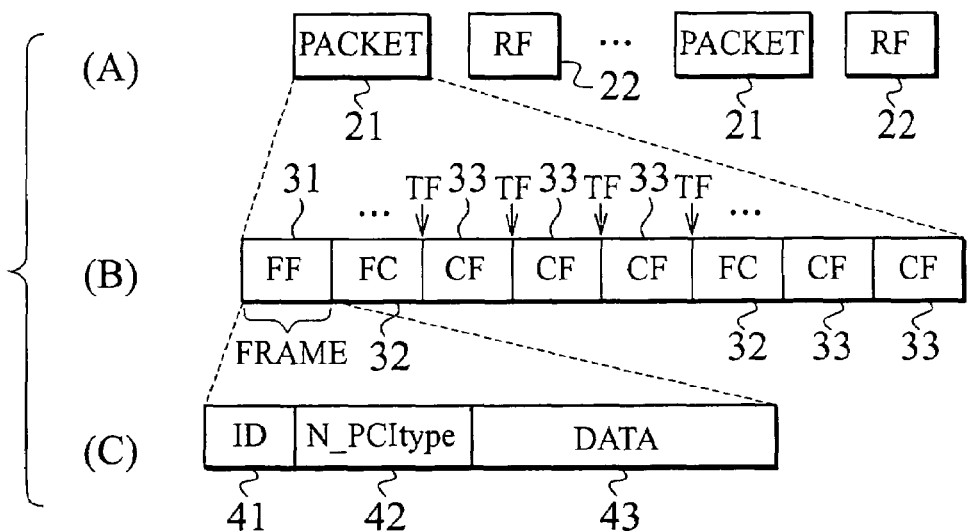
FIG. 3 is a schematic diagram showing (A) packets and response frames, (B) the structure of each packet, and (C) the structure of each frame to be exchanged between a multiplex communication system in the data transmitting side and a multiplex communication system in the data receiving side.

In the case where communication is made between the multiplex communication system 1A and the multiplex communication system 1B after the channel setting process is performed, each of the multiplex communication system 1A and the multiplex communication system 1B stores frame type identification information (N_PCItype) indicative of a frame type in a frame type identification information field 42 as illustrated in FIG. 3(C). This frame type identification information takes a numeral value (integer) from 0 to 5 so that the multiplex communication system 1A and the multiplex communication system 1B can recognize the type of a frame with reference to the numeral value.

In this embodiment, when the value of the frame type identification information takes "0", the frame is a single frame SF in conformity with OSEK (Offene System fund deren Schnittstellen fur die Elektronik im Kraftfahrzeug) or ISO (International Standardization Organization) 15765. Also, when the value of the frame type identification information is "1", the frame is a first frame FF. In this case, the data field 43 as shown in FIG. 3(C) is used to store the information required for initiating data transmission between the respective multiplex communication systems 1.

When the value of the frame type identification information is "2", the frame is a CAN frame CF (Consecutive Frame) for caryying data to be transmitted. In this case, the data field 43 is used to store the data to be transmitted to the data receiving side.

When the value of the frame type identification information is "3", the frame is a flow control frame FC for controlling the transmission process in the data transmitting side. In this case, the data field 43 is used to store separation time (STmin: Separation Time min) information indicative of the minimum interval between adjacent frames which can be successively transmitted, and block size (BS) information indicative of the number of frames which can be successively received.

When the value of the frame type identification information is "4", the frame is a response frame RF. In this case, the data field 43 is used in the data receiving side to store information indicating that the frame data is received.

When the value of the frame type identification information is "5", the frame is a transmission frame RF for controlling the transmission process in the data transmission side. In this case, the data field 43 is used in the data receiving side to store transmission time TTmin (Transmission Time min) information indicative of the minimum interval between successive frames as transmitted, and a maximum successive data reception packet size RPS (Reception Packet Size). This maximum successive data reception packet size RPS is preset for each multiplex communication system 1 depending upon the capacity of the data reception memory 13 thereof and the processing speed for data reception of a data reception processing unit 15.

In the case where communication is made between the multiplex communication system 1A and the multiplex communication system 1B after the channel setting process is performed, outgoing data is divided into packets 21 by the data transmission processing unit 14 of the multiplex communication system 1A, as illustrated in FIG. 3(A) while the data reception processing unit 15 of the multiplex communication system 1B receives the frames contained in each of the packets 21. After receiving all the frames contained in each of the packets 21, the data reception processing unit 15 of the multiplex communication system 1B returns a response frame 22 indicating that the reception has been completed. The data transmission processing unit 14 of the multiplex communication system 1A then receives the response frame 22 and, in response to this, starts transmission of the next packet 21.

Figure 4:
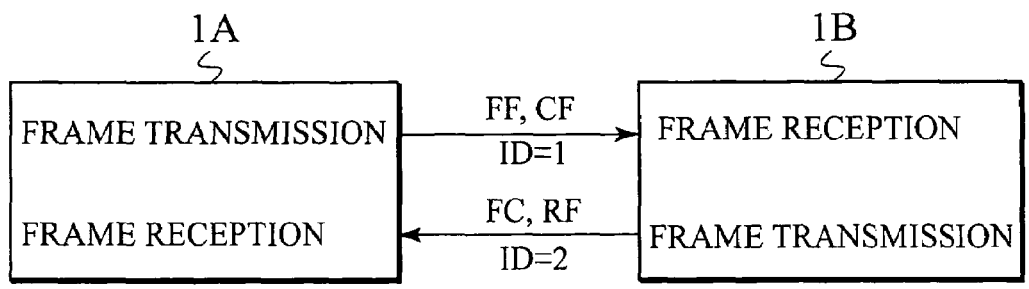
FIG. 4 is an explanatory view for explaining information to be exchanged between a multiplex communication system in the data transmitting side and a multiplex communication system in the data receiving side.
Figure 5:
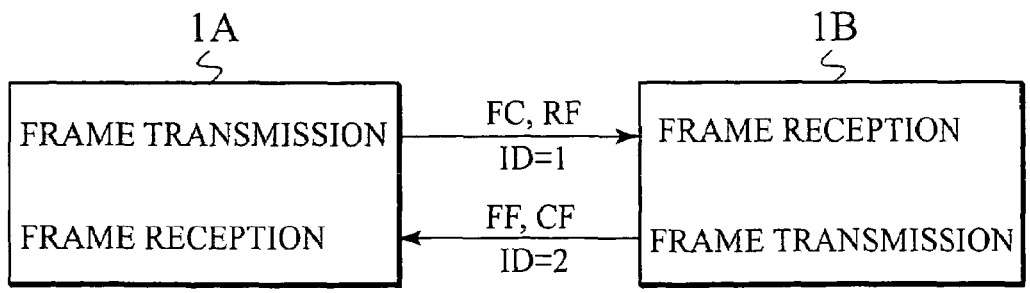
FIG. 5 is an explanatory view for explaining another example of information to be exchanged between a multiplex communication system in the data transmitting side and a multiplex communication system in the data receiving side.

As illustrated in FIG. 4 and FIG. 3(B), the frames transmitted from the multiplex communication system 1A to the multiplex communication system 1B are first frames FF and CAN frames CF while the frames transmitted from the multiplex communication system 1B to the multiplex communication system 1A are flow control frames FC and response frames RF. In the case where the multiplex communication system 1B is in the data transmission side and the multiplex communication system 1A is in the data receiving side, the types of the frames received and transmitted are inverted as illustrated in FIG. 5.

A packet 21 is composed of a first frame 31 transmitted from the multiplex communication system 1A in the data transmitting side, a flow control frame 32 transmitted from the multiplex communication system 1B in the data receiving side, and a plurality of CAN frames 33 transmitted from the multiplex communication system 1A as illustrated in FIG. 3(B). The transmission scheme of transmitting a single packet in the form of a plurality of types of frames obtained by dividing the single packet is called MPDT (Multiple Packet Data Transfer). In this case, the number of CAN frames 33 which can be included within a single packet 21 and successively transmitted is determined on the basis of the block size information BS contained in the flow control frame 32, a maximum successive data transmission packet size TPS and the maximum successive data reception packet size RPS.

As illustrated in FIG. 3(C), each frame is divided into an ID field 41, a frame type identification information field 42 and a data field 43. The ID field 41 contains a frame ID which is set by the channel setting process as described above while the frame type identification information field 42 contains frame type identification information. The data field 43 is used to store outgoing data by the multiplex communication system 1A in the data transmitting side while the data field 43 is used to store block size information and transmission time TTmin by the multiplex communication system 1B in the data receiving side.

In this configuration, between adjacent frames of the respective frames 31 to 33, a transfer control frame is transmitted from the multiplex communication system 1B in the data receiving side to the multiplex communication system 1A in the data transmitting side, repeatedly at the predetermined time interval of 0.5 seconds. This transfer control frame TF contains, in its data field, a transmission interval TTmin and a maximum successive data reception packet size RPS.

On the other hand, when receiving a transfer control frame TF by the data reception processing unit 15, the multiplex communication system 1A in the data transmitting side compares, by means of a comparing and controlling unit 16, the maximum successive data reception packet size RPS as obtained with the maximum successive data transmission packet size TPS (Transmission Time min) as maintained in advance. If the maximum successive data reception packet size RPS is greater than the maximum successive data transmission packet size TPS, the comparing and controlling unit 16 serves to set the packet size, to be actually transmitted, to the maximum successive data transmission packet size TPS. Conversely, if the maximum successive data transmission packet size TPS is greater than or equal to the maximum successive data reception packet size RPS, the comparing and controlling unit 16 serves to set the packet size, to be actually transmitted, to the maximum successive data reception packet size RPS.

By this configuration, the multiplex communication system 1A in the data transmitting side can adjust the packet size by determining the number of frames which can be successively transmitted, for example by determining the number of CAN frames CF.

This maximum successive data transmission packet size TPS is preset for each multiplex communication system 1 depending upon the capacity of the data transmission memory 12 thereof and the processing speed for data transmission of the data transmission processing unit 14.

Figure 6:
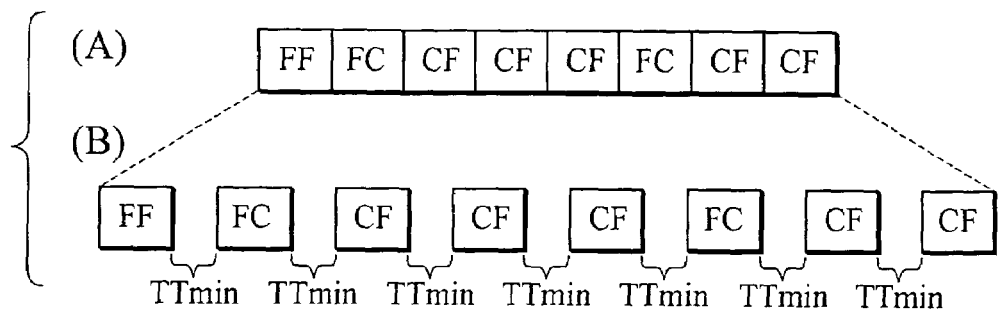
FIG. 6 is a schematic diagram showing the structure (A) of each packet and the interval (B) between the frames contained in each packet.

After the packet size is determined in this manner, when a packet received or transmitted between the multiplex communication system 1A and the multiplex communication system 1B comprises a plurality of frames as illustrated in FIG. 6(A), the respective frames are transmitted at the transmission interval TTmin contained in the transfer control frame TF as illustrated in FIG. 6(B).

Figure 7:
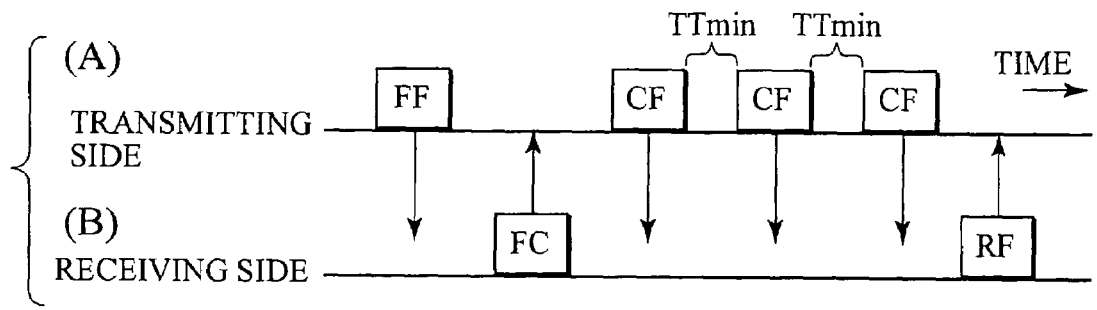
FIG. 7 is a schematic diagram showing (A) the frame to be transmitted from a multiplex communication system in the data transmitting side and (B) the frame to be transmitted from a multiplex communication system in the data receiving side.

In this case, the communication between the multiplex communication system 1A and the multiplex communication system 1B is initiated by first transmitting a first frame FF from the multiplex communication system 1A to the multiplex communication system 1B as illustrated in FIG. 7(A), and, in response to this, transmitting a flow control frame FC from the multiplex communication system 1B to the multiplex communication system 1A as illustrated in FIG. 7(B). Then, the multiplex communication system 1A determines the packet size in accordance with the flow control frame FC and the transfer control frame TF as periodically transmitted, and successively transmits CAN frames CF at the transmission interval TTmin while the multiplex communication system 1B successively receives the CAN frames CF. After receiving all the CAN frames contained in a packet, the multiplex communication system 1B transmits a response frame RF to the multiplex communication system 1A, and the multiplex communication system 1A starts packet transmission of the next packet.

Figure 8:
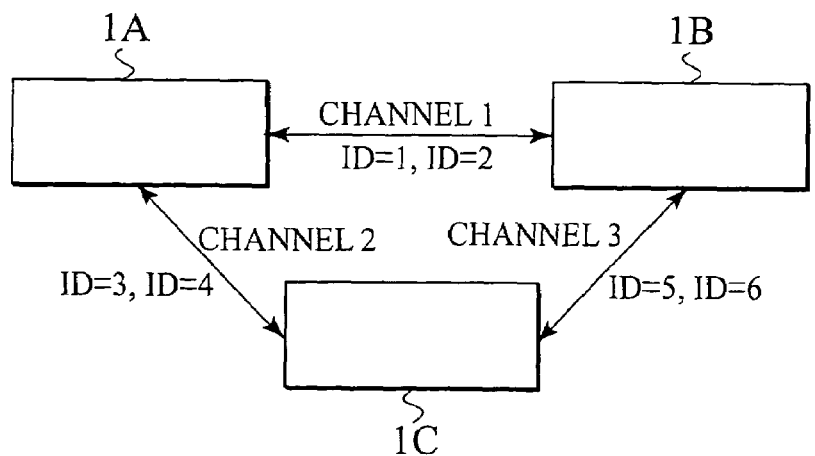
FIG. 8 is a view for explaining the process of setting frame IDs among three multiplex communication systems.

In accordance with the configuration of the multiplex communication system 1 as described above, when a multiplex communication system 1A, a multiplex communication system 1B and a multiplex communication system 1C are interconnected for data communication among the multiplex communication system 1A, the multiplex communication system 1B and the multiplex communication system 1C as illustrated in FIG. 8, the channel setting process is performed to create a channel 1 between the multiplex communication system 1A and the multiplex communication system 1B, a channel 2 between the multiplex communication system 1A and the multiplex communication system 1C, and a channel 3 between the multiplex communication system 1C and the multiplex communication system 1B. By this configuration, data transmission/reception among these multiplex communication systems is achieved by the above process while "1" is set as the frame ID for transmission from the multiplex communication system 1A to the multiplex communication system 1B, "2" is set as the frame ID for transmission from the multiplex communication system 1B to the multiplex communication system 1A, "3" is set as the frame ID for transmission from the multiplex communication system 1A to the multiplex communication system 1C, "4" is set as the frame ID for transmission from the multiplex communication system 1C to the multiplex communication system 1A, "5" is set as the frame ID for transmission from the multiplex communication system 1B to the multiplex communication system 1C, and "6" is set as the frame ID for transmission from the multiplex communication system 1C to the multiplex communication system 1B.

Implementation of the Data Communication Process

Figure 9:
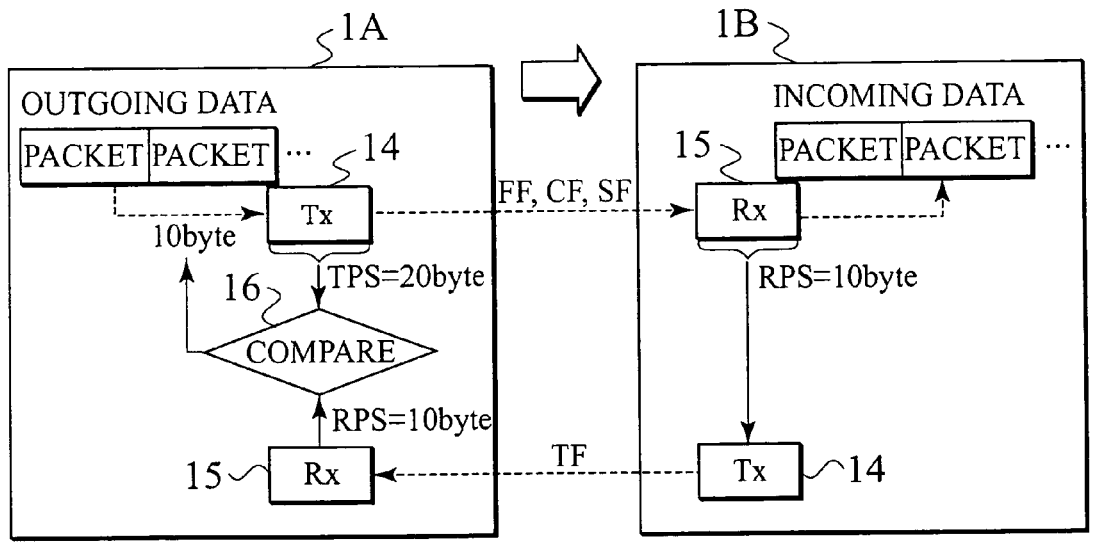
FIG. 9 is a view for explaining the process of transmitting data from a multiplex communication system having the maximum successive data transmission packet size TPS of 20 bytes and a multiplex communication system having the maximum successive data reception packet size RPS of 10 bytes.

The communication process performed by the multiplex communication system 1 as described above will be explained in detail. It is assumed for explanation, as illustrated in FIG. 9, that the multiplex communication system 1A is in the data transmitting side, the multiplex communication system 1B is in the data receiving side, the maximum successive data transmission packet size TPS of the multiplex communication system 1A is 20 bytes, and the maximum successive data reception packet size RPS of the multiplex communication system 1B is 10 bytes.

In this situation, the multiplex communication system 1B can inform the multiplex communication system 1A of the maximum successive data reception packet size RPS and the transmission interval TTmin by periodically transmitting the transfer control frame TF through the data transmission processing unit 14. After receiving the maximum successive data reception packet size RPS through the data reception processing unit 15, the multiplex communication system 1A compares the maximum successive data transmission packet size TPS and the maximum successive data reception packet size RPS by means of the internal comparing and controlling unit 16, and judges that the maximum successive data reception packet size RPS of 10 bytes is smaller than the maximum successive data transmission packet size TPS of 20 bytes.

The multiplex communication system 1A divides outgoing data stored in the data transmission memory 12 into 10-byte data units, creates one or more CAN frames CF for transmitting each 10-byte data unit by means of the data transmission processing unit 14 in order to prepare a packet, and successively transmits the packet containing the 10-byte data unit at the frame transmission interval TTmin.

Figure 10:
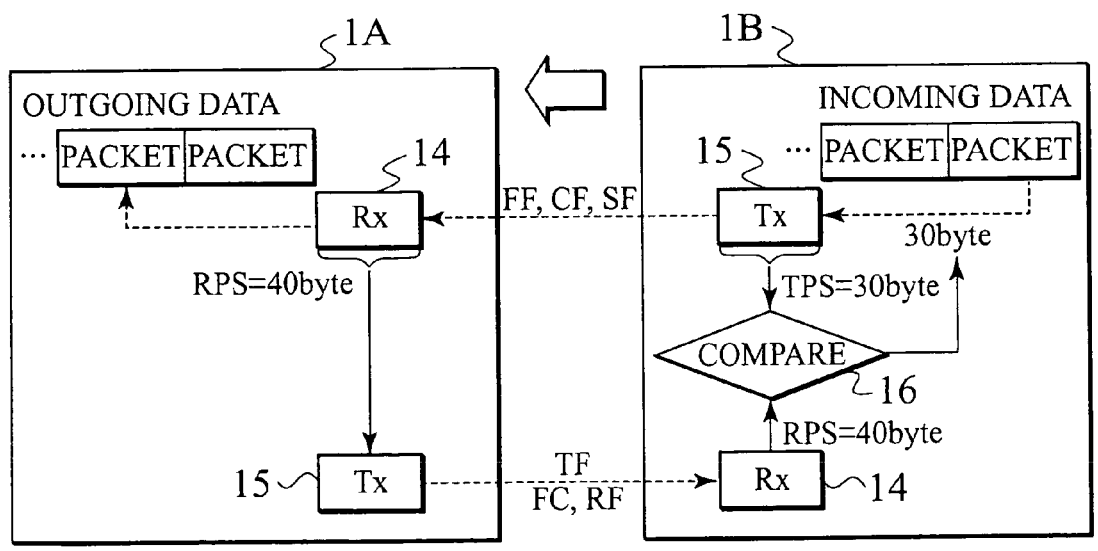
FIG. 10 is a view for explaining the process of transmitting data from a multiplex communication system having the maximum successive data transmission packet size TPS of 30 bytes and a multiplex communication system having the maximum successive data reception packet size RPS of 40 bytes.

As another specific example of the communication process, it is assumed as illustrated in FIG. 10 that the multiplex communication system 1B is in the data transmitting side; that the multiplex communication system 1A is in the data receiving side, the maximum successive data reception packet size RPS of the multiplex communication system 1A is 40 bytes, and the maximum successive data transmission packet size TPS of the multiplex communication system 1B 30 bytes.

In this situation, the multiplex communication system 1A can inform the multiplex communication system 1B of the maximum successive data reception packet size RPS and the transmission interval TTmin by periodically transmitting the transfer control frame TF. After receiving the maximum successive data reception packet size RPS, the multiplex communication system 1B compares the maximum successive data transmission packet size TPS and the maximum successive data reception packet size RPS by means of the internal comparing and controlling unit 16, and judges that the maximum successive data reception packet size RPS of 40 bytes is greater than the maximum successive data transmission packet size TPS of 30 bytes.

The multiplex communication system 1B divides outgoing data stored in the data transmission memory 12 into 30-byte data units, creates one or more CAN frames CF for transmitting each 30-byte data unit by means of the data transmission processing unit 14 in order to prepare a packet, and successively transmits the packet containing the 30-byte data unit at the frame transmission interval TTmin.

Two-Way Data Communication Process Between Multiplex Communication

Systems

Figure 11:
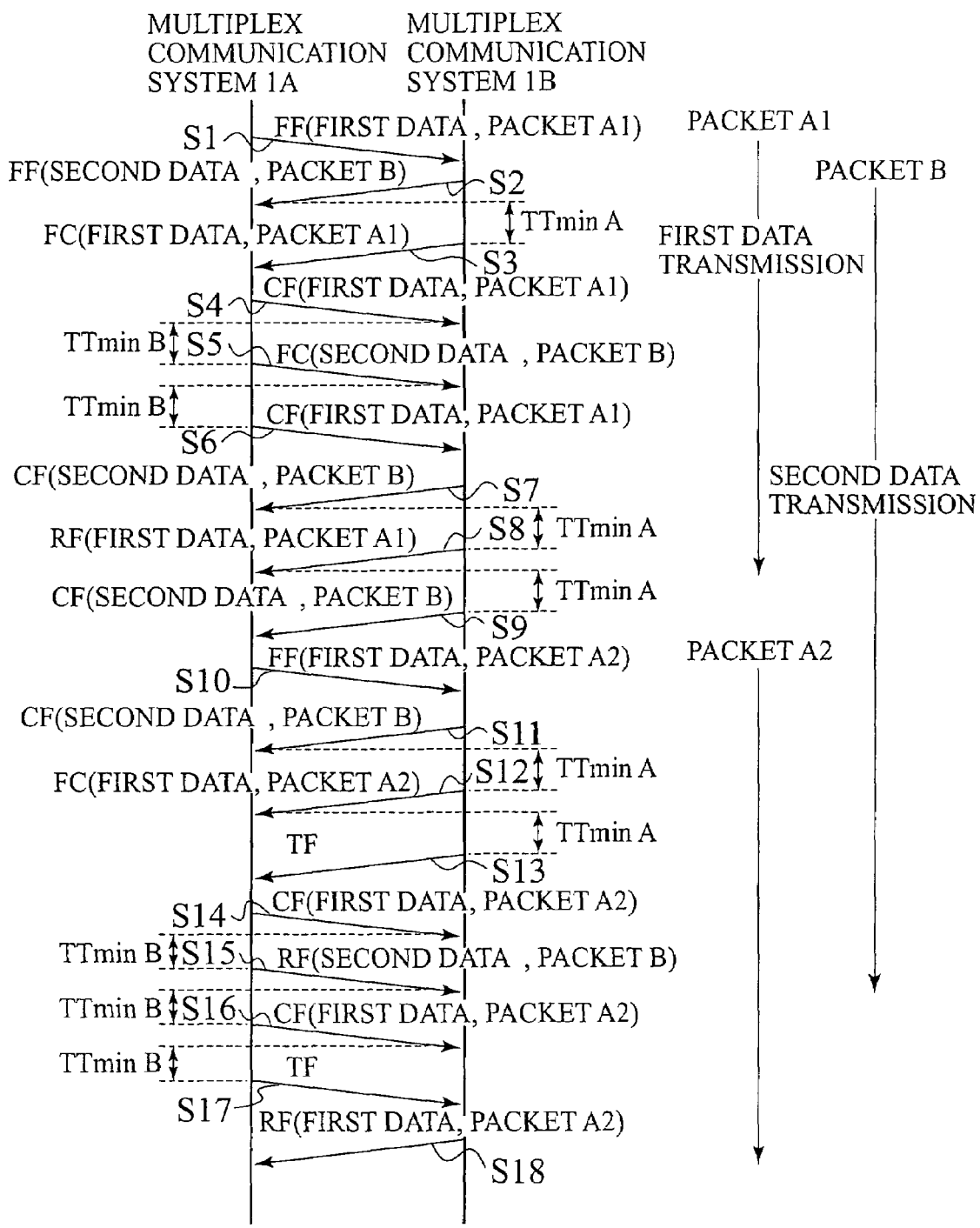
FIG. 11 is a flow chart for explaining the communication process for bi-directionally transmitting and receiving data.

The process of performing a two-way data communication process between multiplex communication systems 1 bidirectionally at the same time will be explained with reference to the flowchart as illustrated in FIG. 11.

In the process as illustrated in FIG. 11, first data is transmitted from the multiplex communication system 1A to the multiplex communication system 1B through the data transmission processing unit 14 while second data is transmitted from the multiplex communication system 1B to the multiplex communication system 1A through the data processing section 14. As illustrated in FIG. 11, a first frame FF (S1) indicative of the transmission of the first data is transmitted from the multiplex communication system 1A to the multiplex communication system 1B while a first frame FF (S2) indicative of the transmission of the second data is transmitted from the multiplex communication system 1B to the multiplex communication system 1A. By means of the first frames FF, each of the multiplex communication system 1A and the multiplex communication system 1B is informed of the request for data transmission by the other multiplex communication system 1.

In this case, after exchanging the first frames FF (S1, S2), the multiplex communication system 1A and the multiplex communication system 1B start the transmission of transfer control frames TF including the respective maximum successive data reception packet sizes RPS and the transmission intervals TTmin thereof. By means of the transfer control frames TF, the multiplex communication system 1A can designate the transmission interval TTminA for frame transmission from the multiplex communication system 1B while the multiplex communication system 1B can designate the transmission interval TTminA for frame transmission from the multiplex communication system 1A.

Each of the multiplex communication system 1A and the multiplex communication system 1B determines the amount of data which can be successively transmitted by comparing the maximum successive data transmission packet size TPS as internally stored with the maximum successive data reception packet size RPS contained in the transfer control frame TF as received. The multiplex communication system 1A determines to transmit the outgoing data as a packet A1 and a packet A2 by dividing it while the multiplex communication system 1B determines to transmit the outgoing data as a single packet B without division.

In this situation, the multiplex communication system 1B transmits a flow control frame FC (S3) at the transmission interval TTminA from the first frame FF (S2) while the multiplex communication system 1A starts the transmission of CAN frames CF (S4) of the packet A1 containing the first data. The multiplex communication system 1A transmits a flow control frame FC (S5) responsive to the first frame FF (S2) at the transmission interval TTminB contained in the transfer control frame TF from the multiplex communication system 1B, followed by transmitting a CAN frame CF (S6).

On the other hand, after receiving the flow control frame FC (S5) from the multiplex communication system 1A, the multiplex communication system 1B starts the transmission of a CAN frame CF (S7) of the packet B containing the second data.

After the multiplex communication system 1A successively transmits the CAN frames CF (S4, S6), the multiplex communication system 1B successively receives the CAN frames CF (S4, S6) and, in response to this, returns a response frame RF (S8) to the multiplex communication system 1A followed by transmitting a CAN frame CF (S9) of the packet B at the transmission interval TTminA.

After receiving the response frame RF (S8) from the multiplex communication system 1B, the multiplex communication system 1A transmits a first frame FF (S10) indicative of the transmission of the packet A2 following the packet A1 to the multiplex communication system 1B.

In response to this, after the transmission of a CAN frame CF (S11) containing the second data, the multiplex communication system 1B transmits a flow control frame FC (S12) to the multiplex communication system 1A at the transmission interval TTminA, and further transmits the transfer control frame TF (S13) at the transmission interval TTminA. After receiving the transfer control frame TF (S13), the multiplex communication system 1A transmits a CAN frame CF (S14) of the packet A2 containing the first data.

After the multiplex communication system 1B successively transmits the CAN frames CF (S7, S9, S11), the multiplex communication system 1A successively receives the CAN frames CF (S7, S9, S11) and in response to this, returns the response frame RF (S15).

The multiplex communication system 1A transmits the CAN frames CF (S16) of the packet A2 at the transmission interval TTminB, and further transmits the transfer control frame TF (S17).

After the multiplex communication system 1A successively transmits the CAN frames CF (S14, S16), the multiplex communication system 1B successively receives the CAN frames CF (S14, S16) and, in response to this, returns the response frame RF (S18) to the multiplex communication system 1A.

By this process, the multiplex communication system 1A finishes the transmission of the first data as the packet A1 and the packet A2 while the multiplex communication system 1B finishes the transmission of the second data as the packet B. The multiplex communication system 1A stores the second data in the data reception memory 13 as the incoming data followed by transferring the second data the data processing section 11 in the data reception process while the multiplex communication system 1B stores the first data in the data reception memory 13 followed by transferring the first data the data processing section 11 in the data reception process.

As explained above in detail, in accordance with the present invention, when data is transmitted, the maximum successive data reception packet size RPS of the multiplex communication system 1 in the data receiving side is compared with the maximum successive data transmission packet size TPS in the data transmitting side to select the smaller packet size therefrom, followed by successively transmitting data, and therefore the multiplex communication system 1 in the data receiving side can surely receive the successive data. In other words, in accordance with the present invention, even in the case where the memory capacity of the data transmission memory 12 in the data transmitting side is different from the memory capacity of the data reception memory 13 in the data receiving side so that the data amounts thereof handled for successive data communication are different from each other, it is possible to successively perform data communication and even when the memory capacity of a terminal is changed by the design change of the system, it is not needed to redesign the whole system with respect to the memory capacities.

Also, in accordance with the present invention, the multiplex communication system 1 in the data receiving side provides the multiplex communication system 1 in the data transmitting side with the maximum successive data reception packet size RPS, in advance of successively transmitting and receiving, and therefore it is possible to prevent data from being discarded and so forth because of the memory capacity for receiving data being smaller than that for transmitting data of the multiplex communication system 1 in the data transmitting side.

Furthermore, in accordance with the present invention, the transmission of frames from the multiplex communication system 1A to the multiplex communication system 1B is controlled in accordance with the transmission interval TTminB as indicated while the transmission of frames from the multiplex communication system 1B to the multiplex communication system 1A is controlled in accordance with the transmission interval TTminA as indicated, and therefore it is possible to surely receive data as transmitted and realize two-way data communication at an optimum data transmission speed.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A data transmitting device comprising:
   a data transmitting and receiving part communicating with a second communication system and transmitting data destined for the second communication system in data frames to the second communication system, wherein
   the data transmitting and receiving part receives, from the second communication system, information indicative of a first data amount which is successively received by the second communication system; and
   the data transmitting device successively transmits, to the second communication system through the data transmitting and receiving part, data frames whose amount corresponds to the first data amount or a second data amount which can be successively transmitted by the data transmitting and receiving part, whichever is not greater, wherein
   the second data amount is a data amount corresponding to the storage capacity of a temporary memory for data transmission of the data transmitting and receiving part of the data transmitting device while the first data amount is a data amount corresponding to the storage capacity of a temporary memory for data reception of the second communication system.

2. A data communication system provided with at least two data transmitting devices as set forth in claim 1 wherein one of the data transmitting devices is the second communication system.

3. A data transmitting method comprising:
   receiving, from a destination of data transmission, information indicative of a first data amount which is successively received by the destination of data transmission, and
   transmitting data frames whose amount corresponds to the first data amount or a second data amount which can be successively transmitted to the destination of data transmission, whichever is not greater, wherein the second data amount is a data amount corresponding to the storage capacity of a data transmission memory for temporarily storing outgoing data, and the first data amount is a data amount corresponding to the storage capacity of a data reception memory for temporarily storing incoming data in the destination of data transmission.

4. A data transmitting method of a data communication system having a first communication device and a second communication device, a data transmitting method of the first communication device comprising:

temporarily storing data destined for the second communication device;

comparing between a first data amount which is successively received by the second communication device and a second data amount which is successively transmitted by the first communication device;

selecting a smaller data amount of the first data amount and the second data amount according to the comparison result;

creating a packet by dividing the data by means of data frames so that the data frames with a data amount corresponding to the selected data amount are transmitted successively to the second communication device; and transmitting the packet to the second communication device.

5. The data transmitting method of a data communication system as set forth in claim 4 wherein, the second data amount is a data amount corresponding to the storage capacity of a data transmission memory of the first communication device for temporarily storing outgoing data, and the first data amount is a data amount corresponding to the storage capacity of a data reception memory of the second communication device for temporarily storing incoming data in the destination of data transmission.

6. The data transmitting method as set forth in claim 4 wherein information indicative of an interval, at which the respective data frames are transmitted, is further received from the destination of data transmission when receiving the information indicative of the first data amount from the destination of data transmission; and the data frames are successively transmitted at an interval that is not narrower than the interval as indicated.

7. A data transmitting method of a data communication system according to claim 4, a data transmitting method of the second communication device comprising:

transmitting information indicative of the first data amount to the first communication device responsive to a request of the first communication device; and receiving the packet so that the data frames are received successively.

8. A data transmitting method of a data communication system according to claim 4, wherein transmitting information indicative of starting the transmission of the data from the first communication device to the second communication device; and returning information indicative of the first data amount from the second communication device to the first communication device as the second communication device receives the information indicative of starting the transmission of the data.

9. A data communication system having a first communication device and a second communication device configured to communicate with each other, the first communication device comprising:

a memory configured to temporarily store data destined for the second communication device;

a data transmitting and receiving part configured to communicate with a second communication device and transmit data to the second communication device by means of data frames;

a comparator configured to compare between a first data amount which is successively received by the second communication device and a second data amount which is successively transmitted by the data transmitting and receiving part;

a selector configured to select a smaller data amount of the first data amount and the second data amount according to the comparison result of the comparator; and a controller of the data transmitting and receiving part configured to create a packet so that the data frames with a data amount corresponding to the selected data amount are transmitted successively to the second communication device.

10. The data communication system as set forth in claim 9 wherein, the second data amount is a data amount corresponding to the storage capacity of a temporary memory for data transmission of the data transmitting and receiving part of the first communication device while the first data amount is a data amount corresponding to the storage capacity of a temporary memory for data reception of the second communication device.

11. The data communication system as set forth in claim 9 wherein, the first communication device receives information indicative of the transmission interval of the respective data frames from the second communication device through the data transmitting and receiving part, and the data frames are successively transmitted at an interval iie that is not narrower than the transmission interval.

12. A data communication system according to claim 9, wherein the second communication device comprises:

a second data transmitting and receiving part configured to communicate with the first communication device and transmit or receive data to each other; and a second controller of the second data transmitting and receiving part configured to transmit information indicative of the first data amount to the first communication device.

13. A data communication system according to claim 9, wherein the first communication device transmits information indicative of starting the transmission of the data to the second communication device; and the second communication device transmits information indicative of the first data amount to the first communication device as the second communication device receives the information indicative of starting the transmission of the data.

14. A data communication system having at least two multiplex communication devices, comprising:

a first multiplex communication device which is configured to successively receive data frames from a second multiplex communication device, and transmit, to the second multiplex communication device, information indicative of a first data amount which is successively received by the second multiplex communication device; and the second multiplex communication device successively transmits, to the first multiplex communication device, data frames whose amount corresponds to the first data amount or a second data amount which is successively transmitted by said second multiplex communication device, whichever is not greater, wherein the second data amount is a data amount corresponding to the storage capacity of a temporary memory for data transmission of the first multiplex communication device while the first data amount is a data amount corresponding to the storage capacity of a temporary memory for data reception of the second multiplex communication device.

15. The data communication system as set forth in claim 14 wherein, the second multiplex communication device transmits, to the first multiplex communication device, information indicative of an interval at which the respective data frames are transmitted, and the first multiplex communication device successively transmits the data frames at a frame interval that is not narrower than the interval as indicated.

* * * * *